United States Patent [19]
White

[11] Patent Number: 5,911,464
[45] Date of Patent: Jun. 15, 1999

[54] AUXILIARY TAILGATE

[76] Inventor: Keith Richard White, 12780 261st Street, Maple Ridge, British Columbia, Canada, V2W 1C3

[21] Appl. No.: 08/961,634

[22] Filed: Oct. 30, 1997

[51] Int. Cl.⁶ .................................................. B62D 33/02
[52] U.S. Cl. .......................................................... 296/26.11
[58] Field of Search ........................................... 296/26.11

[56] References Cited

U.S. PATENT DOCUMENTS

| | | | |
|---|---|---|---|
| 1,454,784 | 5/1923 | Gilmore | 296/26.11 |
| 2,350,050 | 5/1944 | Lim | 296/26.11 |
| 5,700,047 | 12/1997 | Leitner et al. | 296/26.11 |

*Primary Examiner*—Gary C. Hoge

[57] ABSTRACT

An auxiliary tail gate is provided including a gate assembly having a generally U-shaped configuration defined by an end extent and a pair of side extents. The side extents are mounted to the rear extent of the truck such that the gate assembly pivots about an axis which intersects both side walls of the truck, wherein the side extents of the gate assembly are adapted to slide within a plane which includes the axis.

12 Claims, 3 Drawing Sheets

AUXILIARY TAILGATE

BACKGROUND OF THE INVENTION

1. Field of the Invention

The present invention relates to tailgates and more particularly pertains to a new auxiliary tailgate for augmenting the size of a rear extent of a truck and further allowing the convenient unloading of articles therefrom.

2. Description of the Prior Art

The use of tailgates is known in the prior art. More specifically, tailgates heretofore devised and utilized are known to consist basically of familiar, expected and obvious structural configurations, notwithstanding the myriad of designs encompassed by the crowded prior art which have been developed for the fulfillment of countless objectives and requirements.

Known prior art tailgates include U.S. Pat. No. 5,154,470; U.S. Pat. No. 5,443,586; U.S. Pat. No. Des. 249,677; U.S. Pat. No. Des 289,516; U.S. Pat. No. 5,116,096; U.S. Pat. No. 5,273,339; and U.S. Pat. No. 5,441,220.

In these respects, the auxiliary tailgate according to the present invention substantially departs from the conventional concepts and designs of the prior art, and in so doing provides an apparatus primarily developed for the purpose of augmenting the size of a rear extent of a truck and further allowing the convenient unloading of articles therefrom.

SUMMARY OF THE INVENTION

In view of the foregoing disadvantages inherent in the known types of tailgates now present in the prior art, the present invention provides a new auxiliary tailgate construction wherein the same can be utilized for augmenting the size of a rear extent of a truck and further allowing the convenient unloading of articles therefrom.

The general purpose of the present invention, which will be described subsequently in greater detail, is to provide a new auxiliary tailgate apparatus and method which has many of the advantages of the tailgates mentioned heretofore and many novel features that result in a new auxiliary tailgate which is not anticipated, rendered obvious, suggested, or even implied by any of the prior art tailgates, either alone or in any combination thereof.

To attain this, the present invention generally comprises a truck having a rear extent with a flat bottom and a pair of side walls defining an open top and an open rear. The rear extent of the truck further has a gate with a rectangular configuration. A bottom edge of the gate is hingably coupled along a rear edge of the bottom for pivoting between a vertical closed orientation and a horizontal open orientation. As shown in FIGS. 1 & 2 a pair of mounts are provided each including a circular planar base screwably coupled to an interior surface of the side walls of the truck adjacent the open rear thereof. A tube is concentrically coupled to the base and extends inwardly therefrom. For reasons that will become apparent hereinafter, a set of diametrically opposed bores are formed in the tube. Next provided is a gate assembly including a plurality of spaced rails each essentially residing in a separate common plane. Each rail includes an end linear extent situated in parallel with the rear edge of the bottom of the truck. Coupled to ends of the end linear extent is a pair of side linear extents which extend in perpendicular relationship therewith and which terminate at ends. The rails include a top rail and a bottom rail with ends which connect to form an arcuate portion that is coupled to the end of an intermediate rail. A pair of linear interconnects are coupled between the end linear extents of the rails adjacent to the side linear extents thereof and extend beyond the top rail and bottom rail a predetermined distance. With attention now to FIG. 2, shown are a pair of interconnects including two C-shaped sleeves each with a pair of diametrically opposed apertured flanges extending therefrom. The sleeves are adapted for encompassing the side linear extents of the intermediate rail and further being fixed at a selectively determined point along a length thereof by way of a pair of bolts. One of the sleeves of each interconnect has a cylinder coupled thereto. Such cylinder serves to be slidably and rotatably situated within the tube of the mounting base. The cylinder has a set of diametrically opposed apertures for allowing the selective placement of a pin through one set of the bores of the mounts and one set of the apertures of the cylinder. As such, the respective orientation between the rail assembly and mounts may be fixed about the an axis.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new auxiliary tailgate apparatus and method which has many of the advantages of the tailgates mentioned heretofore and many novel features that result in a new auxiliary tailgate which is not anticipated, rendered obvious, suggested, or even implied by any of the prior art tailgates, either alone or in any combination thereof.

It is another object of the present invention to provide a new auxiliary tailgate which may be easily and efficiently manufactured and marketed.

It is a further object of the present invention to provide a new auxiliary tailgate which is of a durable and reliable construction.

An even further object of the present invention is to provide a new auxiliary tailgate which is susceptible of a low cost of manufacture with regard to both materials and labor, and which accordingly is then susceptible of low prices of sale to the consuming public, thereby making such auxiliary tailgate economically available to the buying public.

Still yet another object of the present invention is to provide a new auxiliary tailgate which provides in the apparatuses and methods of the prior art some of the advantages thereof, while simultaneously overcoming some of the disadvantages normally associated therewith.

Still yet another object of the present invention is to provide a new auxiliary tailgate for augmenting the size of a rear extent of a truck and further allowing the convenient unloading of articles therefrom.

Even still another object of the present invention is to provide a new auxiliary tailgate that includes a gate assembly having a generally U-shaped configuration defined by an end extent and a pair of side extents. The side extents are mounted to the rear extent of the truck such that the gate assembly pivots about an axis which intersects both side walls of the truck, wherein the side extents of the gate assembly are adapted to slide within a plane which includes the axis.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
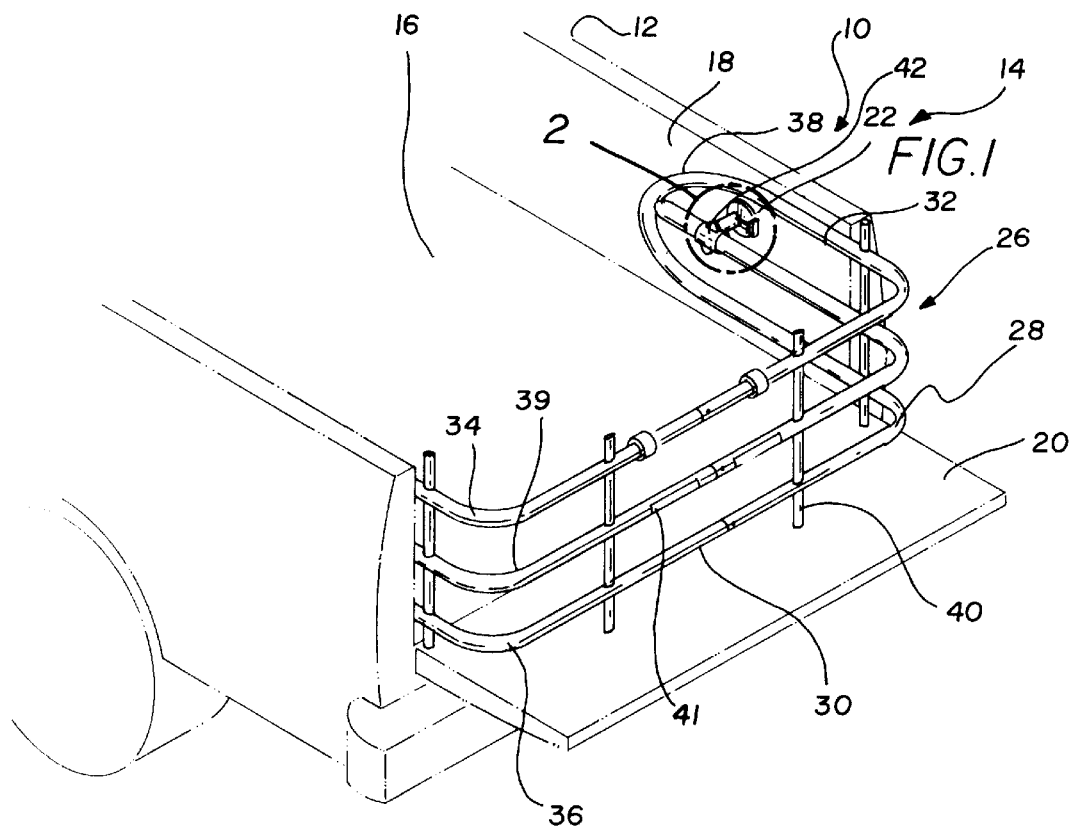
FIG. 1 is a perspective view of a new auxiliary tailgate according to the present invention with the rail assembly in a first orientation thereof.

With reference now to the drawings, and in particular to FIGS. 1 through 5 thereof, a new auxiliary tailgate embodying the principles and concepts of the present invention and generally designated by the reference numeral 10 will be described.

The present invention, as designated as numeral 10, is adapted for use with a truck 12 having a rear extent 14 with a flat corrugated bottom 16 and a pair of side walls 18 defining an open top and an open rear. The rear extent of the truck further has a gate 20 with a rectangular configuration. A bottom edge of the gate is hingably coupled along a rear edge of the bottom for pivoting between a vertical closed orientation and a horizontal open orientation.

Figure 2:
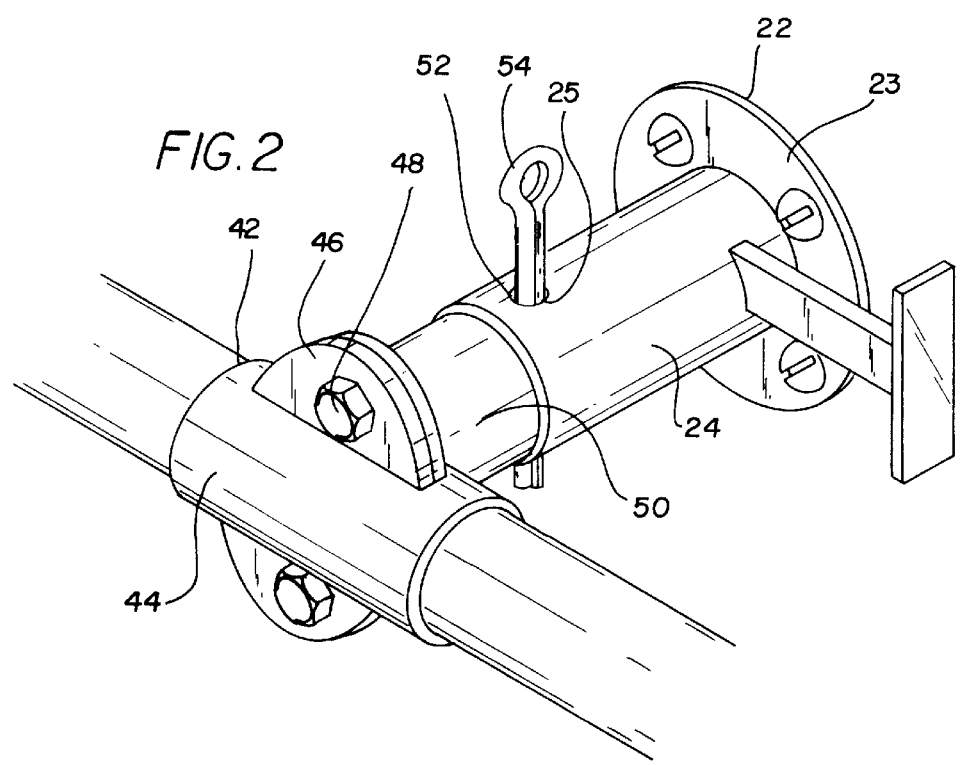
FIG. 2 is an enlarged perspective view of one of the mounts and interconnects of the present invention.

As shown in FIGS. 1 & 2 a pair of mounts 22 are provided each including a circular planar base 23 screwably coupled to a midpoint of an interior surface of the side walls of the truck adjacent the open rear thereof. A tube 24 is concentrically coupled to the base and extends inwardly therefrom. For reasons that will become apparent hereinafter, a set of diametrically opposed bores 25 are formed in the tube. Such bores are contained in a vertical plane.

Next provided is a gate assembly 26 including a plurality of spaced rails 28 each essentially residing in a separate common plane. Each rail includes an end linear extent 30 situated in parallel with the rear edge of the bottom of the truck. Coupled to ends of the end linear extent is a pair of side linear extents 32 which extend in perpendicular relationship therewith and which terminate at ends. Ideally, the side extents each have a length of more than ½ that of the end extents. The rails include a top rail 34 and a bottom rail 36 with ends which connect to form an arcuate portion 38 that is coupled to the end of an intermediate rail 39. Such arcuate portion generally defines a portion of a periphery of circle.

As an option, the end linear extent of each rail may be equipped with a reflector 41, or in the alternative, may have a brake light or turn light formed therein. As a further option, a closed and rigid covering 43 with a size and shape similar to that of the gate assembly may be removably clipped to the gate assembly for allowing small or fine articles such as dirt to be hauled. Similar to the gate assembly, the covering may also be made to expand and contract laterally.

A pair of linear interconnects 40 are coupled between the end linear extents of the rails adjacent to the side linear extents thereof and extend beyond the top rail and bottom rail a predetermined distance. Ideally, ends of the interconnects are each equipped with an elasomeric cap. Optionally, a central portion of a top one of the end linear extents of the spaced rails, as defined by the linear interconnects, may be screwably coupled in linear alignment with the remaining portion of the corresponding spaced rail. Note FIG. 1. By this structure, the central portions may be selectively removed for accommodating fifth wheel-type trailers.

Preferably, the length of the end linear extents are adjustable by way of a telescoping coupling positioned at a central extent thereof. An unillustrated threaded bore and bolt may be employed to fix the length of the end extents during use. As such, a single gate assembly may be employed in trucks with bottoms having any one of the various widths.

With attention now to FIG. 2, shown are a pair of tubular interconnects 42 including two separate C-shaped sleeves 44 each with a pair of diametrically opposed apertured flanges 46 extending therefrom. The sleeves are adapted for encompassing the side linear extents of the intermediate rail and further being fixed at a selectively determined point along a length thereof by way of a pair of bolts 48. In the alternative, a pin and multiple aperture combination may be employed to selectively fix the side linear extents. To facilitate the sliding of the side linear extents, the C-shaped sleeves are each lined with a TEFLON bushing. In the preferred embodiment, the mounting means of the gate assembly is equipped with a safety lock for preventing the theft thereof.

One of the sleeves of each tubular interconnect has a cylinder 50 coupled thereto. Such cylinder serves to be slidably and rotatably situated within the tube of the mounting base. The cylinder has a set of diametrically opposed apertures 52 for allowing the selective placement of a quick release pin 54 through one set of the bores of the mounts and the set of the apertures of the cylinder. As such, the respective orientation between the rail assembly and mounts may be fixed about the an axis. In lieu of the quick release pin, a thumb screw may be used to accomplish the same objective in an alternate embodiment.

Figure 3:
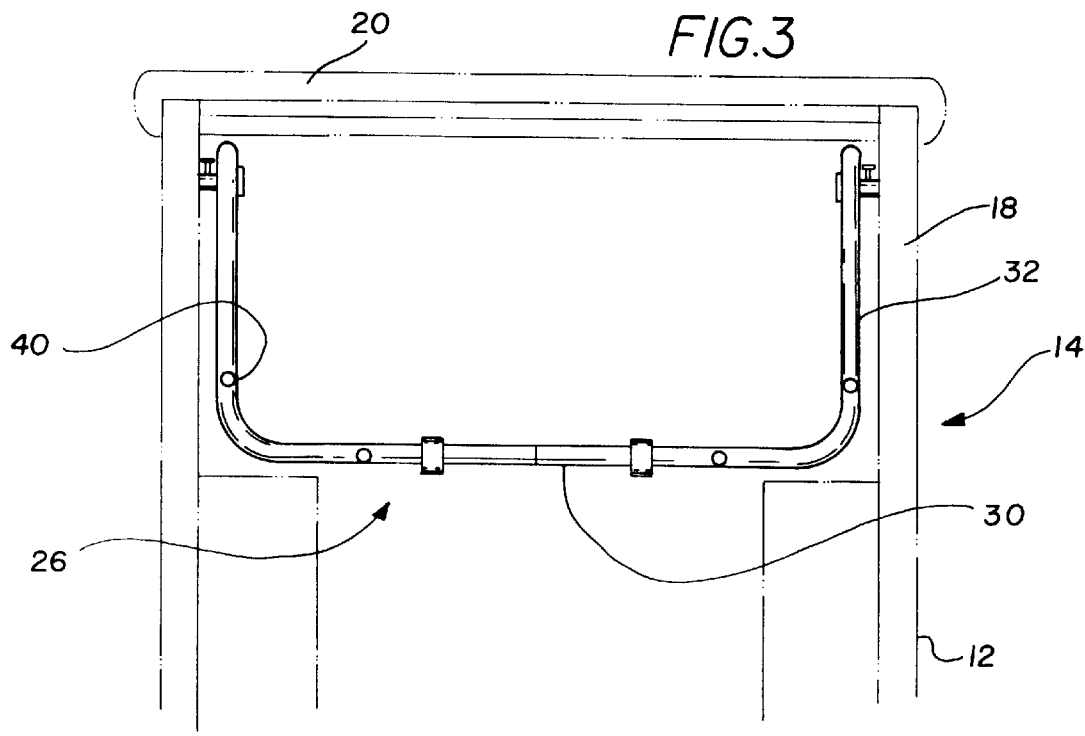
FIG. 3 is a top view of the rail assembly of the present invention in the second orientation thereof.
Figure 4:
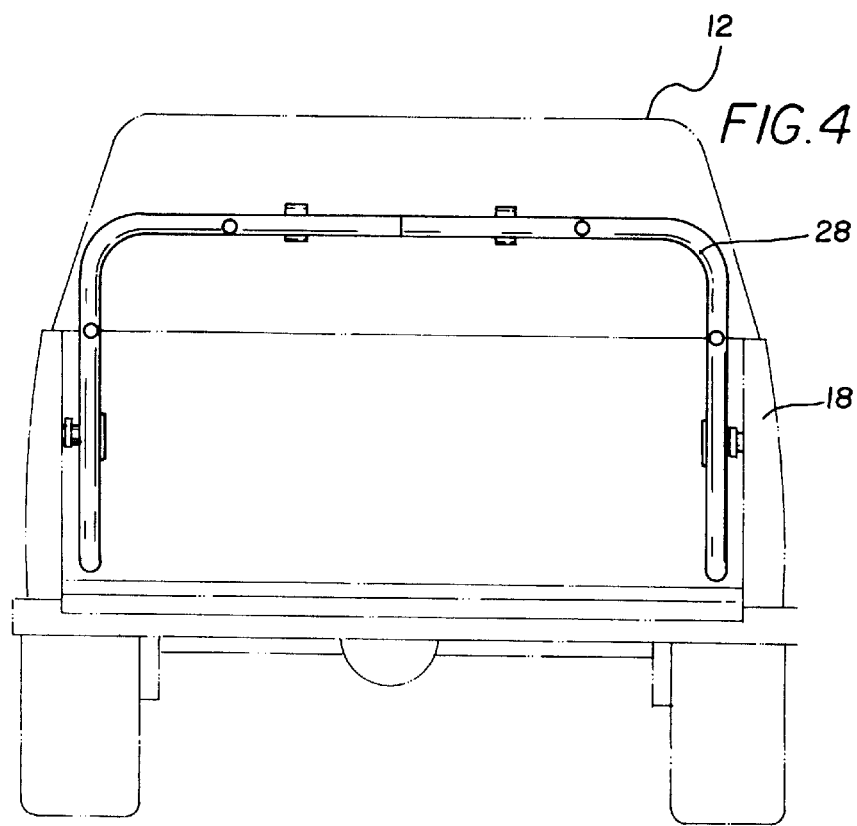
FIG. 4 is a rear view of the rail assembly of the present invention in the third orientation thereof.
Figure 5:
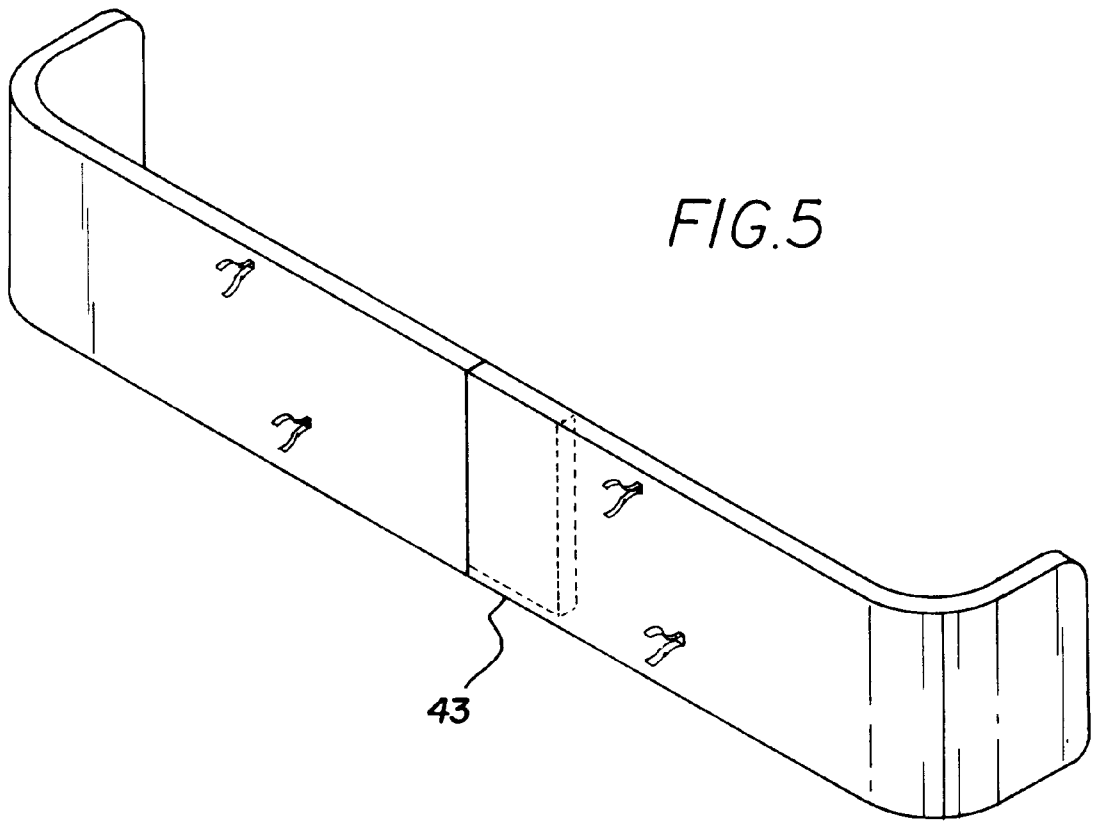
FIG. 5 is a perspective view of the covering of the present invention.

During use, the rail assembly may be slid along the length of the bottom and gate of the truck when the gate is in the open orientation. Further, the rail assembly may be rotated about an axis defined by the mounts such that the end linear extents of the rail assembly may reside in a first orientation within a vertical plane and resting on a rear portion of the rear extent of the bottom of the truck or the gate. Note FIG. 1. In the alternative, the end linear extents of the rail assembly may reside in a second orientation within a vertical plane and resting on a central portion of the bottom of the rear extent of the truck, as shown in FIG. 3. Finally, the end linear extents of the rail assembly is capable of be situated in a third orientation within a horizontal plane above the bottom of the rear extent of the truck. See FIG. 4.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An auxiliary tail gate for a pick up truck comprising, in combination:

a truck having a rear extent with a flat bottom and a pair of side walls defining an open top and an open rear, the rear extent of the truck further having a gate having a rectangular configuration with a bottom edge hingably coupled along a rear edge of the bottom for pivoting between a vertical closed orientation and a horizontal open orientation;

a pair of mounts each including a circular planar base screwably coupled to an interior surface of the side walls of the truck adjacent the open rear thereof, a tube concentrically coupled to the base and extending inwardly therefrom, and a set of diametrically opposed bores are formed therein;

a gate assembly including a plurality of spaced rails each essentially residing in a separate common plane, each rail including an end linear extent situated in parallel with the rear edge of the bottom of the truck and a pair of side linear extents coupled to ends of the end linear extent and extending therefrom in perpendicular relationship therewith to terminate at ends, the rails including a top rail and a bottom rail with ends which connect to form an arcuate portion which are coupled to the end of an intermediate rail and a pair of linear interconnect rods coupled between the end linear extents of the rails adjacent to the side linear extents thereof and extending beyond the top rail and bottom rail a predetermined distance; and a pair of tubular interconnects including two C-shaped sleeves each with a pair of diametrically opposed apertured flanges extending therefrom for encompassing the side linear extents of the intermediate rail and further being fixed at a selectively determined point along a length thereof, one of the sleeves of each tubular interconnect having a cylinder coupled thereto which is adapted to be slidably and rotatably situated within the tube of the mounting base, the cylinder having a set of diametrically opposed apertures for allowing the selective placement of a pin through one set of the bores of the mounts and one set of the apertures of the cylinder thereby fixing the respective orientation between the rail assembly and mounts;

whereby the rail assembly may be slid along the length of the bottom and gate of the truck when the gate is in the open orientation and further rotated about an axis defined by the mounts such that the end linear extents of the rail assembly may fixedly reside in a first orientation within a vertical plane and resting on at least one of a rear portion of the bottom of the truck and the gate thereof, a second orientation within a vertical plane and resting on a central portion of the bottom of the truck, and a third orientation within a horizontal plane above the bottom of the truck.

2. A tail gate for use with a truck having a rear extent with a flat bottom and a pair of side walls defining an open top and an open rear, the tail gate comprising:

a gate assembly having a generally U-shaped configuration defined by an end extent and a pair of side extents, the side extents mounted to the rear extent of the truck such that the gate assembly pivots about an axis which intersects both side walls of the truck;

wherein the side extents of the gate assembly are adapted to slide within a plane which includes the axis; and a mount fixed with respect to the truck each with a tube having a set of diametrically opposed bores formed therein and further including a pair of cylinders coupled to the gate assembly each having a set of diametrically opposed apertures for allowing the selective placement of a pin through the bores of the mounts and the apertures of the cylinder thereby fixing the respective orientation between the rail assembly and mounts.

3. A tail gate for a pick up truck as set forth in claim 2 wherein the end extent may be selectively lengthened and shortened.

4. A tail gate for a pick up truck as set forth in claim 2 wherein the gate assembly may be fixed about the axis.

5. A tail gate for a pick up truck as set forth in claim 2 wherein the side extents may be selectively precluded from sliding within the plane which includes the axis.

6. A tail gate for a pick up truck as set forth in claim 2 and further including a pair of linear interconnect rods coupled to the end linear extent and extended beyond a top rail and bottom rail thereof a predetermined distance.

7. A tail gate for a pick up truck as set forth in claim 2 wherein the gate assembly is defined by a plurality of discrete rails.

8. A tail gate for use with a truck having a rear extent with a flat bottom and a pair of side walls defining an open top and an open rear, the tail gate comprising:

a gate assembly having a generally U-shaped configuration defined by an end extent and a pair of side extents, the side extents mounted to the rear extent of the truck such that the gate assembly pivots about an axis which intersects both side walls of the truck;

wherein the side extents of the gate assembly are adapted to slide within a plane which includes the axis; and a pair of linear interconnect rods coupled to the end linear extent and extended beyond a top rail and bottom rail thereof a predetermined distance.

9. A tail gate for a pick up truck as set forth in claim 8 wherein the end extent may be selectively lengthened and shortened.

10. A tail gate for a pick up truck as set forth in claim 8 wherein the gate assembly may be fixed about the axis.

11. A tail gate for a pick up truck as set forth in claim 8 wherein the side extents may be selectively precluded from sliding within the plane which includes the axis.

12. A tail gate for a pick up truck as set forth in claim 8 wherein the gate assembly is defined by a plurality of discrete rails.

* * * * *